No. 606,836. Patented July 5, 1898.
D. M. FORSYTH.
HORSE CHECK AND HITCHING DEVICE.
(Application filed July 16, 1897.)
(No Model.)
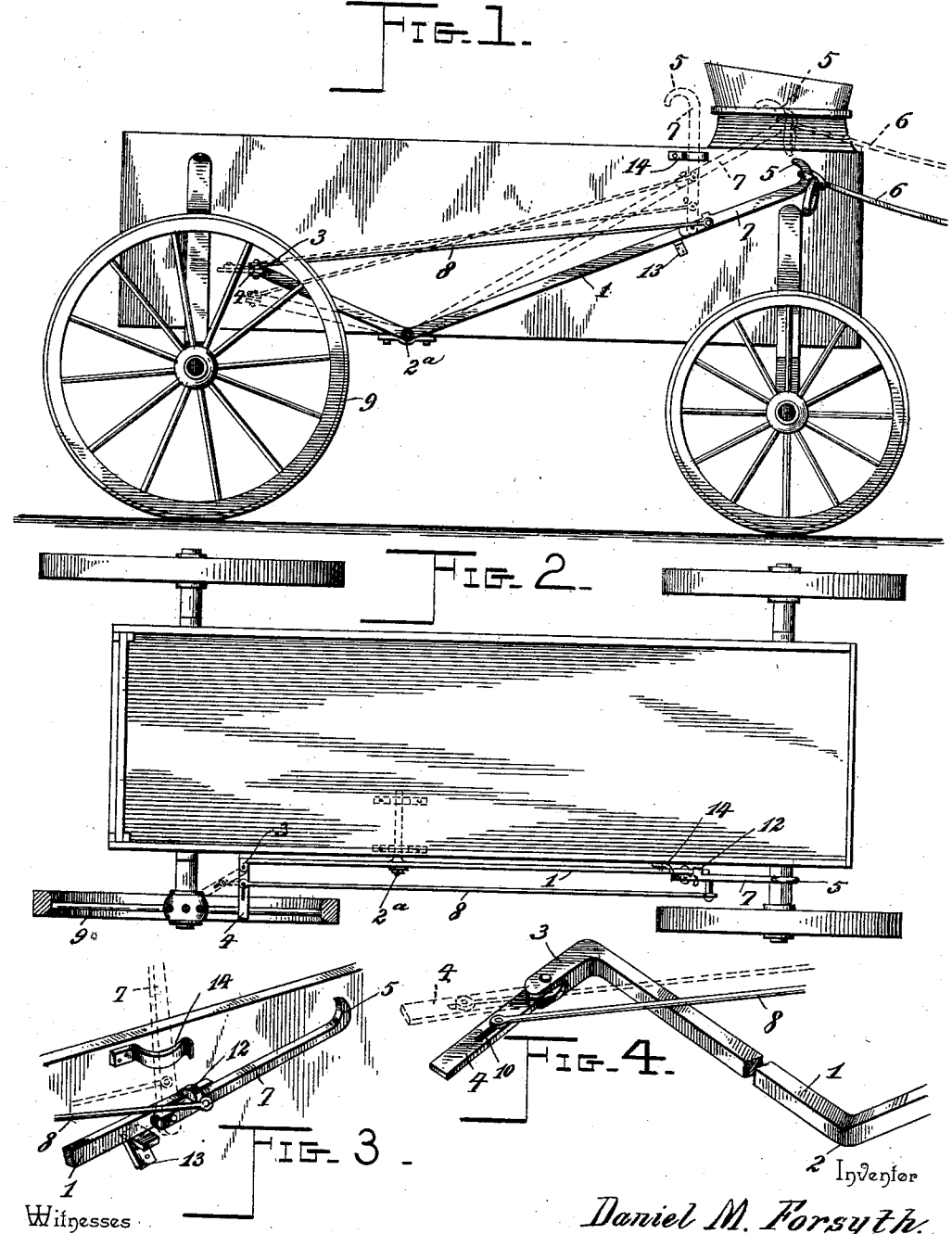
Witnesses
John F. Deufferwiel
V. B. Hillyard.
Inventor
Daniel M. Forsyth.
By his Attorneys,
C. A. Snow & Co.

UNITED STATES PATENT OFFICE.

DANIEL M. FORSYTH, OF FRANKLIN, INDIANA.

HORSE CHECK AND HITCHING DEVICE.

SPECIFICATION forming part of Letters Patent No. 606,836, dated July 5, 1898.

Application filed July 16, 1897. Serial No. 644,822. (No model.)

*To all whom it may concern:*

Be it known that I, DANIEL M. FORSYTH, a citizen of the United States, residing at Franklin, in the county of Johnson and State of Indiana, have invented a new and useful Horse Check or Hitching Device, of which the following is a specification.

The inconvenience and annoyance resulting from the use of weights for holding horses when left standing are the chief objections against their general use, and various means have been devised for securing the animal when not being driven and left unattended at a given point.

The purpose of the present invention is to combine with the vehicle, such as an express or delivery wagon, means for holding the animal when unattended, said means coöperating with a wheel of the vehicle and the lines, so as to hold the animal and prevent it moving forward or backing to any appreciable or material extent. The device is so organized that the wheel with which it coöperates is locked in the event of the animal backing without drawing upon the lines and when the animal moves forward to draw upon the lines and hold it in check, the lines being released when the animal comes to rest, thereby not requiring a backing of the vehicle with the object of attaining this end.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a wagon of ordinary construction, showing the invention operatively applied, the dotted lines indicating the position assumed by the parts when the vehicle is drawn forward after the hitching means have been set. Fig. 2 is a top plan view of the wagon with the hitching devices in position. Fig. 3 is a detail view of the front end of the attachment. Fig. 4 is a detail view of the rear end thereof.

Corresponding and like parts are referred to in the following description and indicated in all the views of the drawings by the same reference characters.

The hitching device is designed to be applied to any form of vehicle and is in the nature of an attachment and comprises an approximately elbow-shaped lever 1, provided at the elbow with an opening 2 to receive the projecting end of a spindle or arm $2^a$, secured to the bottom side of the wagon-body. The rear end of the elbow-lever 1 is bent laterally, as shown at 3, and a latch 4 has pivotal connection therewith and forms, in effect, a continuation or pivoted section thereof. The pivoted latch or extension 4 is adapted when the hitching device is set to project across the plane of the contiguous rear wheel 9 and enter the space between adjacent spokes, so as to be engaged by one or the other of the said spokes, whereby the advantages of the invention are attained.

A lock-lever 7 has pivotal connection with the front end of the elbow-lever 1, and a rod 8 connects the lever 7 a short distance from its fulcrum with the pivoted latch 4 at a point distant from its pivotal attachment with the extension 3. By thus connecting the lock-lever 7 with the latch 4 provision is had for operating the said latch from the driver's seat, so that the attachment may be thrown into and out of action without requiring the dismounting of the driver for this purpose. A slot 10 receives the connection between the rod 8 and the latch 4 and admits of a limited play for the said connection, which is essential for the successful operation of the device. The outer or free end of the lever 7 has a hook 5 to receive the reins or lines 6, which are hitched thereto when the animal is left standing and unattended. A lug 12, extending laterally from the lever 7, engages with the lever 1 and limits the relative downward movement of the lever 7 and holds it and the long arm of the lever 7 in alinement.

When the lock-lever is thrown into the position indicated by the dotted lines in Fig. 1, the pivoted latch 4 is withdrawn from the plane of the rear-wheel 9; but when it is required to hitch the animal or team the reins or lines 6 are engaged with the front or hook end 5 of the lever 7 and the latter is moved into the position indicated by full lines in Figs. 1 and 3, thereby bringing the pivoted latch 4 across the path of the wheel 9 and between contiguous spokes, so that in the event of the wheel turning either forward or backward the pivoted latch will be operated and prevent the horse moving from the place left unattended without being held in check by one or the other means now to be referred to.

In the event of the horse backing the wheel will be locked and caused to slide upon the ground, thereby impeding such retrograde movement, and when the animal moves forward to any appreciable degree the lever 1 will be turned upon its support $2^a$, and its front end moving upward and rearward will draw upon the lines 6 and bring the horse to a stand, as will be readily understood. A stop 13 limits the downward movement of the lever 1, and the lever 7 is held out of action by a spring-catch 14, the stop 13 and catch 14 being applied to a side of the wagon-body.

Having thus described the invention, what is claimed as new is—

1. A horse-hitching device to be applied to a vehicle, consisting of a lever fulcrumed between its ends to the vehicle-body, and provided at its front end with means for connection therewith of the reins or lines, a latch having pivotal connection with the rear end of the lever, a lock-lever applied to the front end of the first-mentioned lever, and a rod connecting the lock-lever with the pivoted latch for throwing the latter into and out of the path of a wheel of the vehicle, substantially as and for the purpose set forth.

2. In a horse-hitching device to be applied to a vehicle, the combination of an approximately elbow-shaped lever having pivotal connection with the vehicle-body at a point between its ends, said lever adapted to have the reins or lines attached to its front end, a pivoted latch applied to the rear end of the lever, and a lever applied directly to the front end of the said elbow-lever, and having connection with the pivoted latch, for throwing it into and out of the path of a wheel of the vehicle, substantially as and for the purpose specified.

3. In a horse-hitching device for vehicles, the combination of an approximately elbow-shaped lever having pivotal connection with the wagon-body at a point between its ends, and having its rear end bent laterally, forming an extension, a latch having pivotal connection with the lateral extension, a lever pivoted to the front end of the elbow-lever, and having its front end hooked or constructed to receive the lines, and a rod connecting the lever with the pivoted latch, substantially as set forth.

4. In combination, an approximately elbow-shaped lever fulcrumed at the elbow upon a spindle applied to the lower side of the vehicle-body and having its rear end bent forming a lateral extension, a pivoted latch applied to the lateral extension, a lock-lever fulcrumed to the front end of the elbow-lever, and having its free end hooked or constructed to receive the lines, and a rod connecting the lock-lever with the pivoted latch, substantially in the manner set forth for the purpose specified.

5. In combination, an approximately elbow-shaped lever fulcrumed to a spindle applied to the lower side of the wagon-body, and having its rear end bent laterally, a slotted latch pivoted to the bent end of the lever, a lock-lever pivoted to the front end of the elbow-lever and having a lateral extension to engage therewith, and adapted to have the reins applied thereto, a rod connecting the lock-lever with the pivoted latch in the manner set forth, a stop, and a catch applied to a side of the wagon-body, substantially as shown for the purpose described.

In testimony that I claim the foregoing as my own I have hereto affixed my signature in the presence of two witnesses.

DAN. M. FORSYTH.

Witnesses:
C. O. CLEMMER,
JOHN DUGAN.